United States Patent
Meixner et al.

(10) Patent No.: US 11,105,400 B2
(45) Date of Patent: Aug. 31, 2021

(54) GEARBOX UNIT FOR A MOTOR VEHICLE

(71) Applicant: AUDI AG, Ingolstadt (DE)

(72) Inventors: Christian Meixner, Ingolstadt (DE);
Carsten Trautmann, Ingolstadt (DE);
Christian Wirth, Eichenried (DE);
Jürgen Tschullik, Berching (DE)

(73) Assignee: AUDI AG, Ingolstadt (DE)

(*) Notice: Subject to any disclaimer, the term of this patent is extended or adjusted under 35 U.S.C. 154(b) by 594 days.

(21) Appl. No.: 16/077,838

(22) PCT Filed: Feb. 20, 2017

(86) PCT No.: PCT/EP2017/053738
§ 371 (c)(1),
(2) Date: Aug. 14, 2018

(87) PCT Pub. No.: WO2017/144392
PCT Pub. Date: Aug. 31, 2017

(65) Prior Publication Data
US 2021/0190180 A1 Jun. 24, 2021

(30) Foreign Application Priority Data
Feb. 24, 2016 (DE) ............... 10 2016 202 870.7

(51) Int. Cl.
*F16H 3/66* (2006.01)
*B60K 17/08* (2006.01)
(Continued)

(52) U.S. Cl.
CPC ............. *F16H 3/666* (2013.01); *B60K 17/08* (2013.01); *B60K 17/3467* (2013.01);
(Continued)

(58) Field of Classification Search
CPC .. F16H 3/666; F16H 57/082; F16H 2200/201; F16H 2702/02; F16H 37/042;
(Continued)

(56) References Cited

U.S. PATENT DOCUMENTS 4,669,569 A * 6/1987 Suzuki .................. B60T 8/00
180/249
4,895,217 A * 1/1990 Hueckler ........... B60K 23/0808
180/233

(Continued)

FOREIGN PATENT DOCUMENTS

CN 101524960 A 9/2009
CN 102189927 A 9/2011
(Continued)

OTHER PUBLICATIONS

European Office Action dated Sep. 11, 2019, in connection with corresponding EP Application No. 17 706 228.8 (7 pgs., including machine-generated English translation).

(Continued)

*Primary Examiner* — Justin Holmes
(74) *Attorney, Agent, or Firm* — Maier & Maier, PLLC

(57) ABSTRACT

A gearbox unit for a motor vehicle, wherein the motor vehicle has a first wheel axle and a second wheel axle, with the second wheel axle being composed of at least one first sub-axle and one second sub-axle. Provided here are a first connecting shaft, which is operatively connectible to the first sub-axle, a second connecting shaft, which is operatively connectible to the second sub-axle, as well as a coupling gearbox with a drive input shaft, which is operatively connectible to a drive assembly of the motor vehicle, and with a drive output shaft, which is operatively connectible to the first wheel axle, wherein, by way of the coupling gearbox, the drive input shaft is operatively connected to the (Continued)

first connecting shaft and the second connecting shaft in a torque-splitting manner.

20 Claims, 2 Drawing Sheets

(51) Int. Cl.
  *B60K 17/346* (2006.01)
  *F16H 57/08* (2006.01)
  *F16H 37/04* (2006.01)
(52) U.S. Cl.
  CPC ...... *F16H 57/082* (2013.01); *B60Y 2400/732* (2013.01); *B60Y 2400/82* (2013.01); *F16H 37/042* (2013.01); *F16H 2200/201* (2013.01); *F16H 2702/02* (2013.01)
(58) Field of Classification Search
  CPC ................ B60K 17/3467; B60K 17/08; B60Y 2400/732; B60Y 2400/82
  See application file for complete search history.

(56) References Cited

U.S. PATENT DOCUMENTS

| | | |
|---|---|---|
| 2009/0163314 A1 | 6/2009 | Bock et al. |
| 2009/0173563 A1 | 7/2009 | Habeck |
| 2013/0017927 A1 | 1/2013 | Morscheck et al. |
| 2013/0303326 A1 | 11/2013 | Downs et al. |
| 2014/0309070 A1 | 10/2014 | Valesh |
| 2015/0018156 A1 | 1/2015 | Hoffman |
| 2015/0291026 A1* | 10/2015 | Meixner ............... B60K 17/346 180/375 |
| 2016/0129784 A1 | 5/2016 | Wein |
| 2016/0265640 A1 | 9/2016 | Kurth |
| 2017/0051816 A1* | 2/2017 | Meixner ............ B60K 23/0808 |

FOREIGN PATENT DOCUMENTS

| | | |
|---|---|---|
| CN | 103298640 A | 9/2013 |
| CN | 104279277 A | 1/2015 |
| CN | 104321213 A | 1/2015 |
| CN | 104608628 A | 5/2015 |
| CN | 105263735 A | 1/2016 |
| DE | 10 2011 007 455 A1 | 10/2012 |
| DE | 10 2012 021 513 A1 | 5/2014 |
| DE | 10 2014 204 573 A1 | 9/2015 |
| DE | 10 2014 013 574 A1 | 12/2015 |
| EP | 2 368 742 A2 | 9/2011 |
| WO | 91/06787 A1 | 5/1991 |
| WO | 2015/062598 A1 | 5/2015 |
| WO | 2015/142266 A1 | 9/2015 |

OTHER PUBLICATIONS

Office Action dated Aug. 27, 2020 in corresponding Chinese Application No. 201780012900.X; 16 pages including English-language translation.

Notification of Transmittal of Translation of the International Preliminary Report on Patentability dated Sep. 7, 2018, in connection with corresponding International Application No. PCT/EP2017/053738 (9 pgs.).

Examination Report dated Aug. 7, 2017 of corresponding German application No. 10 2016 202 870.7; 6 pgs.

Examination Report dated Jan. 24, 2018 of corresponding German application No. 10 2016 202 870.7; 5 pgs.

International Search Report and Written Opinion of the International Search Authority dated Apr. 20, 2017 of corresponding International application No. PCT/EP2017/053738; 18 pgs.

Office Action dated Sep. 11, 2019, in corresponding European Application No. 17 706 228.8 including partial machine-generated English language translation; 7 pages.

* cited by examiner

GEARBOX UNIT FOR A MOTOR VEHICLE

FIELD

The invention relates to a gearbox unit for a motor vehicle, wherein the motor vehicle has a first wheel axle and a second wheel axle, the second wheel axle being composed of at least one first sub-axle and one second sub-axle.

BACKGROUND

A gearbox unit of this kind serves, for example, to transmit a torque between a drive assembly of the motor vehicle and the at least two wheel axles of the motor vehicle. Accordingly, both the first wheel axle and the second wheel axle are linked to the drive assembly by way of the gearbox unit. Consequently, they are at least intermittently driven wheel axles, so that the motor vehicle can exist as an all-wheel-drive motor vehicle. The first wheel axle is, for example, a front axle of the motor vehicle, while the second wheel axle represents the rear axle of the motor vehicle. However, a converse configuration can also exist.

For gearbox units of the kind mentioned, it is possible, for example, to provide a connecting shaft in order to transmit the torque to the second wheel axle, with the connecting shaft being designed, in particular, as a Cardan shaft. In order to achieve good driving characteristics, the second wheel axle usually has to be associated with a differential, which is connected to the connecting shaft and ensures a distribution of the torque supplied via the gearbox unit to the first sub-axle and the second sub-axle. The differential is provided in the operative connection between the connecting shaft and the second wheel axle. However, the differential takes up considerable space.

The object of the invention is to present a gearbox unit that, in comparison to known gearbox units, has advantages and, in particular, makes possible a compact design of the second wheel axle, with preferably no differential, in particular no axle differential, existing between the connecting shaft and the second wheel axle.

SUMMARY

Provided in this case are: a first connecting shaft which is operatively connectible to the first sub-axle, a second connecting shaft which is operatively connectible to the second sub-axle, and a coupling gearbox which has a drive input shaft operatively connectible to the drive assembly of the motor vehicle and a drive output shaft operatively connectible to the first wheel axle, wherein, by way of the coupling gearbox, the drive input shaft is operatively connected in a torque-splitting fashion to the first connecting shaft and to the second connecting shaft, and wherein the drive output shaft is operatively connectible by means of a first coupling and by means of a second coupling to the drive input shaft such that each can shift separately, wherein a first overlay gearing is provided in the operative connection between the first coupling and the drive input shaft and a second overlay gearing is provided in the operative connection between the second coupling and the drive input shaft.

A torque transmission from the gearbox unit in the direction toward the second wheel axle is therefore not accomplished, as is usually the case, by means of only one connecting shaft or Cardan shaft, but rather by at least two connecting shafts, namely, in particular, the first connecting shaft and the second connecting shaft. In this case, the first connecting shaft can be coupled or is coupled to the first sub-axle of the second wheel axle. In contrast, the second connecting shaft can be coupled or is coupled to the second sub-axle of the second wheel axle. Because the torque transmission to the two sub-axles occurs separately from each other by way of the two connecting shafts, it is possible to integrate in the coupling gearbox an otherwise complicated axle differential that would be associated with the second wheel axle. For example, the coupling gearbox only has the axle differential. However, the coupling gearbox can also be present as a double differential, which integrates both the center differential and the axle differential in one construction unit. Accordingly, a space-saving arrangement of the second wheel axle is possible.

Obviously, the invention also relates to a motor vehicle having a gearbox unit which preferably is constructed in the aforementioned manner. The motor vehicle has the first wheel axle and the second wheel axle, wherein the second wheel axle is composed of at least the first sub-axle and the second sub-axle. The motor vehicle is characterized by a first connecting shaft which is operatively connected to the first sub-axle, by a second connecting shaft which is operatively connected to the second sub-axle, as well as by a coupling gearbox having a drive input shaft operatively connected to a drive assembly of the motor vehicle and a drive output shaft operatively connected to the first wheel axle, wherein, by way of the coupling gearbox, the drive input shaft is operatively connected to the first connecting shaft and to the second connecting shaft in a torque-splitting, and wherein the drive output shaft is operatively connectible by means of a first coupling and by means of a second coupling to the drive input shaft such that each can shift separately, wherein a first overlay gearing is provided in the operative connection between the first coupling and the drive input shaft, and a second overlay gearing is provided in the operative connection between the second coupling and the drive input shaft. The motor vehicle or the gearbox unit of the motor vehicle can be further developed in accordance with the present description.

The operative connection by way of the coupling gearbox is made in a torque-splitting fashion. This means that a part of the torque supplied via the drive input shaft is supplied to the first connecting shaft and another part is supplied to the second connecting shaft. It is possible in this way to achieve an equal as well as an unequal torque distribution between the first connecting shaft and the second connecting shaft. Both the first connecting shaft and the second connecting shaft can—optionally—be designed as a Cardan shaft.

In addition to the coupling gearbox, the first overlay gearing and the second overlay gearing are provided. By way of the two overlay gearings, an operative connection can be established between the drive output shaft and the drive input shaft. For this purpose, the first coupling and the second coupling are provided. Therefore, whereas the drive input shaft is operatively connected to the first connecting shaft and to the second connecting shaft by way of the coupling gearbox, preferably rigidly and/or permanently, the drive output shaft is operatively connectible to the drive input shaft by means of the first coupling and the second coupling. Here, the first overlay gearing is arranged in the case of the first coupling and the second overlay gearing is arranged in the case of the second coupling in the coupling connection or in the operative connection between the drive output shaft and the drive input shaft. This means, therefore, that the torque can be transmitted optionally in each case between the drive input shaft and the drive output shaft, on the one hand, via the first coupling and the first overlay gearing and, on the other hand, via the second coupling and the second overlay gearing.

For example, in a first shifting state of the first coupling, the operative connection between the drive output shaft and the drive input shaft is interrupted by way of the first overlay gearing; this applies likewise to a first shifting state of the second coupling for the operative connection by way of the second overlay gearing. In a second shifting state of the first coupling, the drive output shaft is operatively connected to the drive input shaft by way of the first overlay gearing; in analogy to this, in a second shifting state of the second coupling, the drive output shaft is operatively connected to the drive input shaft by way of the second overlay gearing. In this case, the overlay gearing has a specific gear ratio, which, for example, is fixed. Preferably, the gear ratio of the first overlay gearing is identical to that of the second overlay gearing. However, the gear ratios can also differ from each other. Obviously, however, the first overlay gearing and/or the second overlay gearing can alternatively each also have an adjustable gear ratio and, for this purpose, for example, are designed as a multigear or multispeed transmission.

It should be noted that the two overlay gearings are different from the coupling gearbox. In this respect, the operative connection established by way of the overlay gearing between the drive output shaft and the drive input shaft is not present or at least is not completely present by way of the coupling gearbox. By use of the overlay gearing, it is possible, in particular when the motor vehicle is driving around a curve, to transmit a torque from the first sub-axle and/or the second sub-axle of the second wheel axle to the first wheel axle. This means, in particular, that torque can be transmitted to the front axle both by a rear wheel on the outside of the curve and by a rear wheel on the inside of the curve, with preferably a smaller torque being taken from the rear wheel on the outside of the curve than from the rear wheel on the inside of the curve. Overall, therefore, by use of the overlay gearing, it is possible in numerous driving states of the motor vehicle, preferably in any driving state of the motor vehicle, to achieve a "torque vectoring," that is, the deliberate transmission of torque to a specific wheel axle, in particular, from one of the sub-axles or from both sub-axles of the second wheel axle. Each of the overlay gearings can be realized, for example, as a minus planetary gear set or as a plus planetary gear set.

For example, it, it is provided that the coupling gearbox has a planetary gearing or is designed as a planetary gearing, with the drive input shaft as well as the first connecting shaft and the second connecting shaft each being operatively connected directly to the coupling gearbox. The coupling gearbox then represents an axle differential for the second wheel axle. Said coupling gearbox is therefore shifted from an installation location in the region of the second wheel axle into the gearbox unit and is integrated in the gearbox unit. The drive input shaft as well as the two connecting shafts are operatively connected directly to the coupling gearbox. The direct operative connection is understood to mean that the mentioned shafts are each coupled to an element of the coupling gearbox, so that the operative connection does not extend through one of the overlay gearings. In the scope of this description, as long as a direct operative connection is stated, a direct and rigid or rotationally fixed connection is preferably always meant—unless stated otherwise. Elements that are directly operatively connected to one another are in this respect connected to one another in a constant rotational speed and therefore always have the same rotational speed or a rotational speed that is dependent on the gear ratio. In the latter case, the elements exist, in particular, in a constant rotational speed ratio relative to one another.

Another embodiment of the invention provides that the first overlay gearing and the second overlay gearing are designed as planetary gearings, which are each operatively connected directly to the coupling gearbox. One wheel of each of the two overlay gearings is consequently connected to a wheel of the coupling gearbox or is operatively connected to it and, in particular, is directly operatively connected to it, preferably rigidly and/or permanently. For example, an operative connection is present initially directly between the coupling gearbox and the first connecting shaft, on the one hand, and between the coupling gearbox and the second connecting shaft, on the other hand. This means that the corresponding connecting shaft is directly connected in each case to the coupling gearbox, that is, is operatively connected, preferably rigidly and/or permanently, to a wheel of the coupling gearbox.

Additionally or alternatively, it can be provided that the previously mentioned operative connections or at least one of the operative connections, in particular, the operative connection between the coupling gearbox and the first connecting shaft or the operative connection between the coupling gearbox and the second connecting shaft, is present or is present by way of the corresponding overlay gearing. This means, therefore, that an operative connection between the coupling gearbox and the first connecting shaft by way of the first overlay gearing and/or an operative connection between the coupling gearbox and the second connecting shaft by way of the second overlay gearing is (are) present.

A preferred embodiment of the invention provides that the drive output shaft is operatively connectible via the first coupling to the first overlay gearing and via the second coupling to the second overlay gearing. In this respect, the couplings are provided on the side of the overlay gearing associated with the drive output shaft. When the first coupling is completely opened or when the second coupling is completely opened, therefore, the first overlay gearing or the second overlay gearing is completely decoupled from the drive output shaft. At the same time, however, it can be provided that the first overlay gearing is directly operatively coupled, preferably rigidly and/or permanently, to the first connecting shaft and/or the second overlay gearing is directly operatively coupled, preferably rigidly and/or permanently, to the second connecting shaft.

Another embodiment of the invention provides that the coupling gearbox has a coupling gearbox sun gear, a coupling gearbox ring gear, and a coupling gearbox planetary carrier with at least one coupling gearbox planetary gear that meshes with the coupling gearbox sun gear and the coupling gearbox ring gear, with the coupling gearbox ring gear being operatively connected directly to the drive input shaft. In this respect, the coupling gearbox is present as a planetary gearing and has the corresponding elements or gears. Preferably, the drive input shaft is connected or directly operatively connected, rigidly and/or permanently, to the coupling gearbox ring gear. Obviously, however, another embodiment can be provided.

In another preferred embodiment of the invention, it is provided that the coupling gearbox planetary carrier is directly operatively connected to the second connecting shaft and the coupling gearbox sun gear is directly operatively connected to the first connecting shaft. The direct operative connection is preferably rigid and/or permanent. The direct operative connection is to be understood, in turn, to mean an operative connection that preferably is made not by way of one gearbox or a plurality of gearboxes, that is, for example, the coupling gearbox, the first overlay gearing, and/or the second overlay gearing, but by way of a direct coupling.

An enhancement of the invention provides that the coupling gearbox planetary carrier has at least the coupling gearbox planetary gear, designed as an outer planetary gear, and at least one inner planetary gear, which mesh with each other, with the outer planetary gear meshing with the coupling gearbox ring gear and the inner planetary gear meshing with the coupling gearbox sun gear. In this respect, the coupling gearbox is designed as a double planetary gear set. Accordingly, both the outer planetary gear and the inner planetary gear are provided, by way of which the coupling gearbox ring gear and the coupling gearbox sun gear are in operative connection with each other.

Both the outer planetary gear and the inner planetary gear are rotatably arranged or mounted at the coupling gearbox planetary carrier. They mesh with each other, while, at the same time, the outer planetary gear engages in the coupling gearbox ring gear and the inner planetary gear engages in the coupling gearbox sun gear. The outer planetary gear and the inner planetary gear can be arranged at different radial positions with respect to the axis of rotation of the coupling gearbox planetary carrier.

In another embodiment of the invention, it is provided that the first overlay gearing has a first overlay gearing sun gear, a first overlay gearing ring gear, and a first overlay gearing planetary carrier with at least one first overlay gearing planetary gear that meshes with the first overlay gearing sun gear and the first overlay gearing ring gear, with the first overlay gearing ring gear being operatively connectible directly to the drive output shaft via the first coupling. The second overlay gearing is therefore designed as a conventional planetary gearing, the planetary carrier of which can be operatively connected directly to the drive output shaft by way of at least partial or complete closing or engaging of the second coupling.

In another embodiment of the invention, it is provided that the second overlay gearing has a second overlay gearing sun gear, a second overlay gearing ring gear, and a second overlay gearing planetary carrier with at least one second overlay gearing planetary gear that meshes with the second overlay gearing sun gear and the second overlay gearing ring gear, with the second overlay gearing planetary carrier being directly operatively coupled to the drive output shaft via the second coupling. The second overlay gearing is consequently designed analogously to the first overlay gearing. Here, too, it is possible by way of at least partial engagement of the second coupling to operatively couple the planetary carrier directly to the drive output shaft.

In the scope of another embodiment of the invention, it is provided that the second overlay gearing sun gear is directly operatively coupled via the first overlay gearing planetary carrier, in particular, to the drive input shaft and/or the first overlay gearing planetary carrier is directly operatively coupled to the drive input shaft and the coupling gearbox ring gear. In other words, the second overlay gearing sun gear, the first overlay gearing planetary carrier, or both of them is or are connected to the coupling gearbox ring gear as well as to the drive input shaft in a rotationally fixed manner. In the case of the second overlay gearing sun gear, it can be connected, at the same time, to the first overlay gearing planetary carrier in a rotationally fixed manner and can be connected only then by way of said planetary carrier to the drive input shaft or to the coupling gearbox ring gear in a rotationally fixed manner.

Finally, in the scope of another embodiment of the invention, it can be provided that the first overlay gearing sun gear and the second overlay gearing ring gear are operatively connected directly to the first connecting shaft or to the second connecting shaft. The first overlay gearing sun gear and the second overlay gearing ring gear are connected to each other in a rotationally fixed manner. In addition, they are in direct operative connection with the first connecting shaft or the second connecting shaft. The former can be provided, in particular, when the drive output shaft is mounted coaxially in the drive input shaft. The direct operative connection to the second connecting shaft can be provided, in contrast, for the inverse arrangement of drive input shaft and drive output shaft, that is, for a coaxial arrangement of the drive input shaft in the drive output shaft.

Additionally or alternatively, it can be provided that the first connecting shaft can be connected or is connected to the first sub-axle via a first gearbox member and the second connecting shaft can be connected or is connected to the second sub-axle via a second gearbox member, which, in particular, is identical in design to the first gearbox member. The gearbox members are therefore provided between the connecting shafts and the respective sub-axle. These gearbox members can have, for example, a gear stage, in particular, a bevel gear stage. Different gearbox members can hereby be provided for the first sub-axle and the second sub-axle. It is especially advantageous, however, when the second gearbox member of the second sub-axle is identical in design to the first gearbox member of the first sub-axle so that in this respect, a smaller number of different parts need to be available.

Additionally or alternatively, it can further be provided that the first connecting shaft and the second connecting shaft are arranged offset coaxially or parallel with respect to each other. The former is the case, in particular, when the first connecting shaft is directly operatively connected or coupled in a rotationally fixed manner to the coupling gearbox sun gear and the second connecting shaft is directly operatively connected or coupled in a rotationally fixed manner to the coupling gearbox planetary carrier, that is, for example, without an intervening gear stage. The coaxial arrangement of the two connecting shafts makes possible an extremely space-saving embodiment of the gearbox unit. The parallel offset arrangement with respect to each other is provided, in particular, when, for example, the operative connection of the first connecting shaft is made by way of a gear stage or via a coupling that maintains the direction of rotation.

Moreover, it can be provided that the drive output shaft is mounted coaxially in the drive input shaft or vice versa. This, too, serves for reducing the structural size of the gearbox unit.

BRIEF DESCRIPTION OF THE DRAWINGS

The invention will be explained in detail below on the basis of the exemplary embodiments illustrated in the drawing, without any limitation of the invention thereby occurring. Shown herein are.

DETAILED DESCRIPTION

Figure 1:
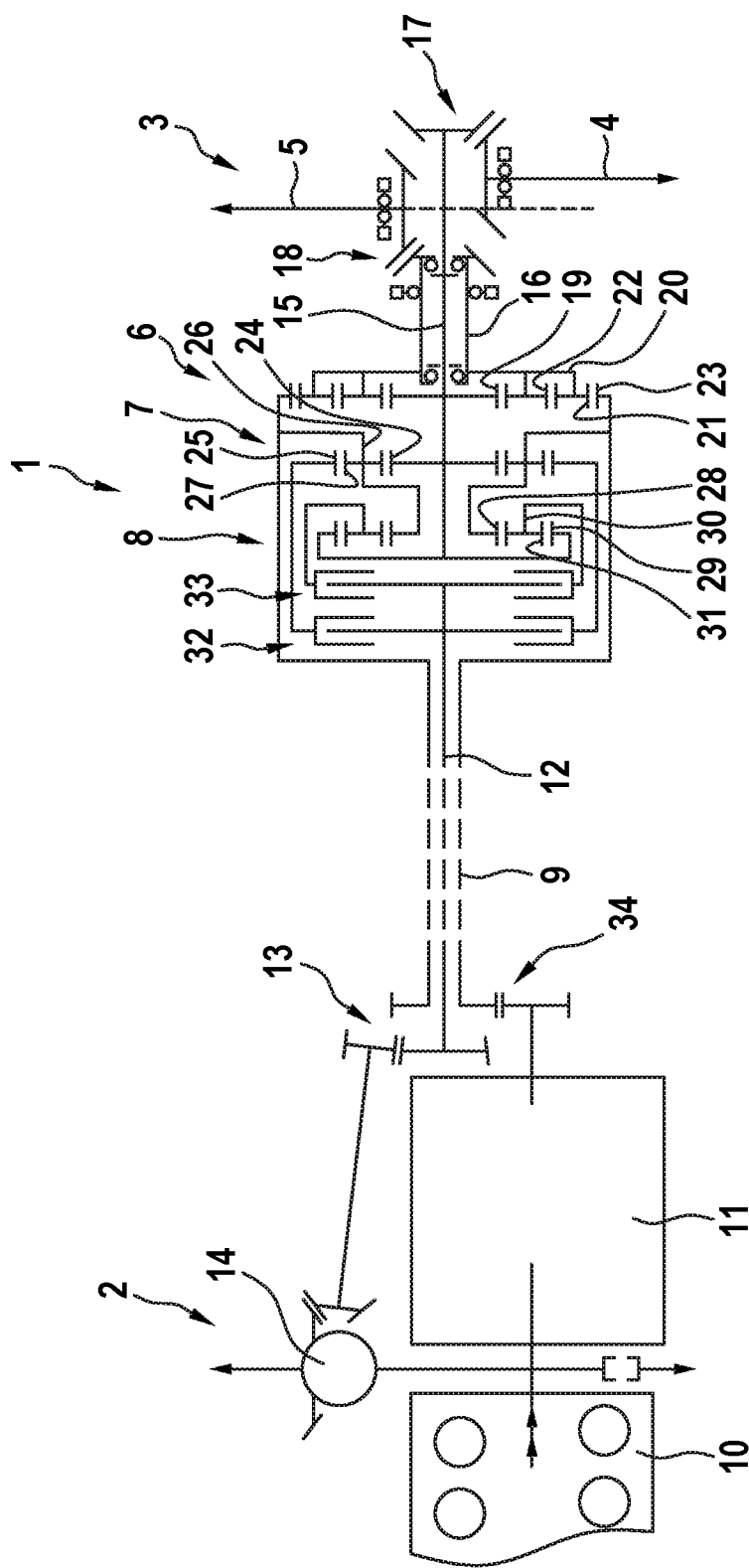
FIG. 1 a gearbox unit for a motor vehicle in a first embodiment.

FIG. 1 shows a first embodiment of a gearbox unit 1 for a motor vehicle, which is indicated here only schematically.

The motor vehicle has a first wheel axle 2 and a second wheel axle 3, which, in turn, are indicated only schematically, with the second wheel axle 3 being composed of at least one first sub-axle 4 and one second sub-axle 5. The gearbox unit 1, the first wheel axle 2, and the second wheel axle 3 form at least one part of a drivetrain of the motor vehicle. The gearbox unit 1 is equipped with a coupling gearbox 6, a first overlay gearing 7, and a second overlay gearing 8. The gearbox unit 1 has a drive input shaft 9, which is operatively connectible to a drive assembly 10 of the motor vehicle by way of a multispeed transmission 11, for example. Furthermore, the gearbox unit 1 is equipped with a drive output shaft 12, at which the first wheel axle 2 is connected via, for example, at least one gear stage 13 and/or an axle differential 14. An operative connection from the coupling gearbox 6 to the second wheel axle 3 or to the first sub-axle 4 and the second sub-axle 5 associated with it is present by way of a first connecting shaft 15 and a second connecting shaft 16. The first connecting shaft 15 is operatively connected to the first sub-axle 4 via a first gearbox member 17, which, for example, is present as a gear stage and the second connecting shaft 16 is operatively connected to the second sub-axle 5 via a second gearbox member 18, which, for example, also is present as a gear stage.

The coupling gearbox 6 is designed as a planetary gearing and has a coupling gearbox sun gear 19 and a coupling gearbox planetary carrier 20. Mounted rotatably at the coupling gearbox planetary carrier 20 are at least one outer planetary gear 21 and one inner planetary gear 22. The inner planetary gear 22 then meshes with the coupling gearbox sun gear 19 as well as with the outer planetary gear 21. The outer planetary gear 21, in contrast, meshes with the inner planetary gear 22 as well as with a coupling gearbox ring gear 23, which is likewise associated with the coupling gearbox 6.

In the exemplary embodiment illustrated here, the drive input shaft 9 is operatively connected or connected in a rotationally fixed manner rigidly and/or permanently to the coupling gearbox ring gear 23. The coupling gearbox planetary carrier 20 is operatively connected or connected in a rotationally fixed manner, in contrast, preferably rigidly and/or permanently, to the second connecting shaft 16. The first connecting shaft 15 is preferably operatively connected or connected in a rotationally fixed manner rigidly and/or permanently to the coupling gearbox sun gear 19.

The first overlay gearing 7 has a first overlay gearing sun gear 24, a first overlay gearing ring gear 25, and a first overlay gearing planetary carrier 26 with at least one overlay gearing planetary gear 27, which meshes with the first overlay gearing sun gear 24 and the first overlay gearing ring gear 25 and which is mounted rotatably at the first overlay gearing planetary carrier 26. For this purpose, the second overlay gearing 8 is composed analogously of a second overlay gearing sun gear 28, a second overlay gearing ring gear 29, and a second overlay gearing planetary carrier 30 with at least one second overlay gearing planetary gear 31, which meshes with the second overlay gearing sun gear 28 and the second overlay gearing ring gear 29 and which is mounted rotatably at the second overlay gearing planetary carrier 30.

The first overlay gearing sun gear 24 is directly operatively connected or coupled in a rotationally fixed manner to the second overlay gearing ring gear 29. At the same time, the first overlay gearing sun gear 24 and the second overlay gearing ring gear 29 are directly operatively connected or connected in a rotationally fixed manner to the first connecting shaft 15 and, accordingly, to the coupling gearbox sun gear 19. Additionally or alternatively, it can be provided that the first overlay gearing planetary carrier 26 is directly operatively connected or connected in a rotationally fixed manner to the second overlay gearing sun gear 28.

In addition, the first overlay gearing planetary carrier 26 and the second overlay gearing sun gear 28 are directly operatively connected or connected in a rotationally fixed manner to the coupling gearbox ring gear 23 and, accordingly, to the drive input shaft 9. In this case, the second overlay gearing sun gear 28 can be connected via the first overlay gearing planetary carrier 26 to the drive input shaft 9 or to the coupling gearbox ring gear 23. In this respect, the first overlay gearing 7 is arranged between the coupling gearbox 6 and the second overlay gearing 8 in the axial direction with respect to an axis of rotation of the drive input shaft 9, for example.

The gearbox unit 1 is further equipped with a first coupling 32 and a second coupling 33. With the help of the first coupling 32, the drive output shaft 12 is operatively connectible or can be coupled to the drive input shaft 9 by way of the first overlay gearing 7. When the coupling 32 is engaged, the first overlay gearing ring gear 25 is fixed with respect to the drive output shaft 12. Analogously to this, the second coupling 33 serves for establishing an operative connection between the drive output shaft 12 and the drive input shaft 9 by way of the second overlay gearing 8. In this case, when the coupling 33 is engaged, the second overlay gearing planetary carrier 30 is fixed with respect to the drive output shaft 12. Through deliberate, at least partial opening or closing of the couplings 32 and 33, a "torque vectoring" can be achieved between the first wheel axle 2 and the second wheel axle 3. In particular, torque can be transmitted from one of the sub-axles 4 and 5 or else from both sub-axles 4 and 5 onto the first wheel axle 2.

Furthermore, it can be seen that the drive input shaft 9 is operatively connected to the drive assembly 10 via a gear stage 34, in particular by way of the multispeed transmission 11. In addition, the drive output shaft 12 is arranged coaxially in the drive input shaft 9.

Figure 2:
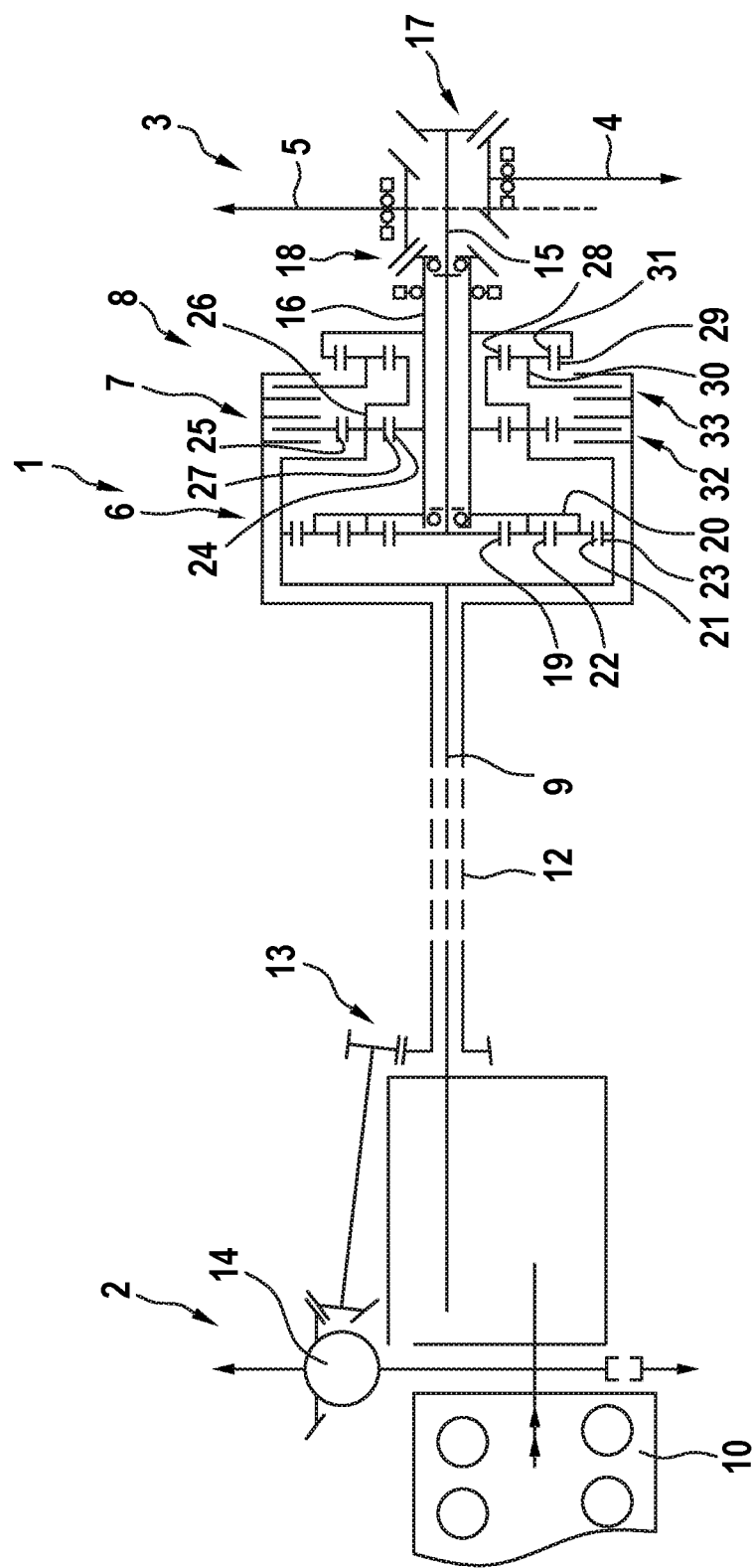
FIG. 2 the gearbox unit in a second embodiment.

FIG. 2 shows a second embodiment of the gearbox unit 1. Fundamentally, reference is made to the previous statements, so that only differences will be addressed below. Whereas, in the scope of the first embodiment, the drive output shaft 12 is arranged coaxially in the drive input shaft 9, the inverse arrangement applies to the second embodiment. Accordingly, the drive input shaft 9 is arranged coaxially in the drive output shaft 12. The gear stage 34 can therefore be dispensed with. Although the first connecting shaft 15 is further directly operatively connected or connected in a rotationally fixed manner to the coupling gearbox sun gear 19, the connections between the first connecting shaft 15 and the first overlay gearing sun gear 24 and the second overlay gearing ring gear 29 are dispensed with. Instead, these connections are provided for the second connecting shaft 16. The second connecting shaft 16 is thus directly operatively connected, on the one hand, to the coupling gearbox planetary carrier 20. On the other hand, it is connected in a rotationally fixed manner to the first overlay gearing sun gear 24 and to the second overlay gearing ring gear 29. The gearbox unit 1 in the second embodiment essentially represents an inverse design of the first embodiment.

The invention claimed is:

1. A gearbox unit for a motor vehicle, wherein the motor vehicle has a first wheel axle and a second wheel axle, with the second wheel axle being composed at least one first sub-axle and one second sub-axle, hereby characterized by a first connecting shaft, which is operatively connectible to the first sub-axle, by a second connecting shaft, which is operatively connectible to the second sub-axle, as well as by a coupling gearbox with a drive input shaft, which is operatively connectible to a drive assembly of the motor vehicle, and with a drive output shaft, which is operatively connectible to the first wheel axle, wherein, by way of the coupling gearbox, the drive input shaft is operatively connected to the first connecting shaft and the second connecting shaft in a torque-splitting manner, and wherein the drive output shaft is operatively connectible to the drive input shaft by means of a first coupling and by means of a second coupling such that each can shift separately, wherein, in the operative connection between the first coupling and the drive input shaft, a first overlay gearing is provided and, in the operative connection between the second coupling and the drive input shaft, a second overlay gearing is provided.

2. The gearbox unit according to claim 1, wherein in that the first overlay gearing and the second overlay gearing are designed as planetary gearings, which are operatively connected directly to the coupling gearbox in each case.

3. The gearbox unit according to claim 1, wherein in that the drive output shaft is operatively connectible to the first overlay gearing by way of the first coupling and to the second overlay gearing by way of the second coupling.

4. The gearbox unit according to claim 1, wherein in that the coupling gearbox has a coupling gearbox sun gear, a coupling gearbox ring gear, and a coupling gearbox planetary carrier with at least one coupling gearbox planetary gear that meshes with the coupling gearbox sun gear and the coupling gearbox ring gear, wherein the coupling gearbox ring gear is directly operatively connected to the drive input shaft.

5. The gearbox unit according to claim 1, wherein in that a coupling gearbox planetary carrier is directly operatively connected to the second connecting shaft and a coupling gearbox sun gear is directly operatively connected to the first connecting shaft.

6. The gearbox unit according to claim 1, wherein in that a coupling gearbox planetary carrier has at least a coupling gearbox planetary gear, which is designed as an outer planetary gear, and at least one inner planetary gear, which mesh with each other, wherein an outer planetary gear meshes with a coupling gearbox ring gear and the inner planetary gear meshes with a coupling gearbox sun gear.

7. The gearbox unit according to claim 1, wherein in that the first overlay gearing has a first overlay gearing sun gear, a first overlay gearing ring gear, and a first overlay gearing planetary carrier with at least one first overlay gearing planetary gear that meshes with the first overlay gearing sun gear and the first overlay gearing ring gear, wherein the first overlay gearing ring gear is operatively connectible directly to the drive output shaft by way of the first coupling.

8. The gearbox unit according to claim 1, wherein in that the second overlay gearing has a second overlay gearing sun gear, a second overlay gearing ring gear, and a second overlay gearing planetary carrier with at least one second overlay gearing planetary gear that meshes with the second overlay gearing sun gear and the second overlay gearing ring gear, wherein the second overlay gearing planetary carrier is operatively connectible directly to the drive output shaft by way of the second coupling.

9. The gearbox unit according to claim 1, wherein in that a second overlay gearing sun gear is directly operatively connected to the drive input shaft, in particular by way of a first overlay gearing planetary carrier, and/or the first overlay gearing planetary carrier is directly operatively connected to the drive input shaft and a coupling gearbox ring gear.

10. The gearbox unit according to claim 1, wherein in that a first overlay gearing sun gear and a second overlay gearing ring gear are operatively connected directly to the first connecting shaft or to the second connecting shaft.

11. The gearbox unit according to claim 2, wherein in that the drive output shaft is operatively connectible to the first overlay gearing by way of the first coupling and to the second overlay gearing by way of the second coupling.

12. The gearbox unit according to claim 2, wherein in that the coupling gearbox has a coupling gearbox sun gear, a coupling gearbox ring gear, and a coupling gearbox planetary carrier with at least one coupling gearbox planetary gear that meshes with the coupling gearbox sun gear and the coupling gearbox ring gear, wherein the coupling gearbox ring gear is directly operatively connected to the drive input shaft.

13. The gearbox unit according to claim 3, wherein in that the coupling gearbox has a coupling gearbox sun gear, a coupling gearbox ring gear, and a coupling gearbox planetary carrier with at least one coupling gearbox planetary gear that meshes with the coupling gearbox sun gear and the coupling gearbox ring gear, wherein the coupling gearbox ring gear is directly operatively connected to the drive input shaft.

14. The gearbox unit according to claim 2, wherein in that a coupling gearbox planetary carrier is directly operatively connected to the second connecting shaft and a coupling gearbox sun gear is directly operatively connected to the first connecting shaft.

15. The gearbox unit according to claim 3, wherein in that a coupling gearbox planetary carrier is directly operatively connected to the second connecting shaft and a coupling gearbox sun gear is directly operatively connected to the first connecting shaft.

16. The gearbox unit according to claim 4, wherein in that the coupling gearbox planetary carrier is directly operatively connected to the second connecting shaft and the coupling gearbox sun gear is directly operatively connected to the first connecting shaft.

17. The gearbox unit according to claim 2, wherein in that a coupling gearbox planetary carrier has at least a coupling gearbox planetary gear, which is designed as an outer planetary gear, and at least one inner planetary gear, which mesh with each other, wherein an outer planetary gear meshes with a coupling gearbox ring gear and the inner planetary gear meshes with a coupling gearbox sun gear.

18. The gearbox unit according to claim 3, wherein in that a coupling gearbox planetary carrier has at least a coupling gearbox planetary gear, which is designed as an outer planetary gear, and at least one inner planetary gear, which mesh with each other, wherein an outer planetary gear meshes with a coupling gearbox ring gear and the inner planetary gear meshes with a coupling gearbox sun gear.

19. The gearbox unit according to claim 4, wherein in that the coupling gearbox planetary carrier has at least the coupling gearbox planetary gear, which is designed as an outer planetary gear, and at least one inner planetary gear, which mesh with each other, wherein the outer planetary gear meshes with the coupling gearbox ring gear and the inner planetary gear meshes with the coupling gearbox sun gear.

20. The gearbox unit according to claim 5, wherein in that a coupling gearbox planetary carrier has at least a coupling gearbox planetary gear, which is designed as an outer planetary gear, and at least one inner planetary gear, which mesh with each other, wherein an outer planetary gear meshes with a coupling gearbox ring gear and the inner planetary gear meshes with a coupling gearbox sun gear.

* * * * *